United States Patent [19]

Mallon

[11] 4,032,715

[45] June 28, 1977

[54] CIRCUIT ARRANGEMENT OF A STEREO-HUNTING DEVICE IN A STEREO DECODER

[75] Inventor: Dietmar Mallon, Zorneding, Germany

[73] Assignee: Siemens Aktiengesellschaft, Berlin & Munich, Germany

[22] Filed: Feb. 20, 1976

[21] Appl. No.: 659,944

[30] Foreign Application Priority Data

Mar. 13, 1975 Germany .......................... 2511079

[52] U.S. Cl. .......................................... 179/15 BT
[51] Int. Cl.² .......................................... H04H 5/00
[58] Field of Search .................. 179/15 BT; 325/36

[56] References Cited

UNITED STATES PATENTS

| | | | |
|---|---|---|---|
| 3,248,484 | 4/1966 | Beckman | 179/15 BT |
| 3,329,773 | 7/1967 | Ochi | 179/15 BT |
| 3,617,641 | 11/1971 | Feit et al. | 179/15 BT |

*Primary Examiner*—Douglas W. Olms
*Attorney, Agent, or Firm*—Hill, Gross, Simpson, Van Santen, Steadman, Chiara & Simpson

[57] ABSTRACT

A sum signal and a difference signal of two reproduction signals, in addition to a pilot tone, are obtained from a received signal in a circuit arrangement for a stereo-hunting device in a stereo decoder. The sum and difference signals are converted by way of a matrix operating with sum and difference formation to form the reproduction signals. In the case of a mono-received signal only the sum signal is present. The sum signal channel has connected therein an attenuator which has a control input for receiving a control voltage and in the absence of the pilot tone the control voltage causes the sum signal channel to become blocked.

3 Claims, 2 Drawing Figures

CIRCUIT ARRANGEMENT OF A STEREO-HUNTING DEVICE IN A STEREO DECODER

BACKGROUND OF THE INVENTION

1. Field of the Invention

This invention relates to a circuit arrangement for a stereo-hunting device in a stereo decoder in which not only a pilot tone, but also a sum signal and a difference signal of two reproduction signals are obtained from a received signal, and more particularly to such an arrangement in which, in a matrix operating with sum and difference formation, the sum and difference signals are converted to form the reproduction signals, and wherein only the sum signal is present in the case of a mono-received signal.

2. Description of the Prior Art

The usual frequency-modulated stereo-multiplex signal used for the transmission of two discrete information channels which, in stereo radio contain the information of two recording devices for left and right, and, accordingly, for two reproduction loud speakers for left and right, consist of three components. The first component is a sum signal (L+R) consisting of the left-hand information L and the right-hand information R in the frequency range from 30 Hz to 15 kHz. The second component is a difference signal (L−R) consisting of the left-hand information L and the right-hand information R, which is modulated onto a suppressed auxiliary carrier, for example 38 kHz. The frequency band for the difference signal (L−R) extends, with the lower and upper side band, from 23 kHz to 53 kHz. A third component serves to transmit a pilot tone of, for example, 19 kHz which permits the regeneration of the 38 kHz auxiliary carrier in the stereo decoder of the receiving device.

If only a mono-transmission takes place, then only the sum signal (L+R) exists. Normally, a signal is obtained from the pilot tone which permits an optimum display of the presence or the absence of a stereo transmission. When a user of a receiving device is searching for a stereo transmission, he must observe this optical display.

SUMMARY OF THE INVENTION

The object of the present invention is to simplify the hunting operation for stereo transmission.

In order to realize the above object, in a circuit arrangement of the type initially described, it is proposed, in accordance with the present invention, that in the sum signal channel there is connected an attenuator which possesses a control input for a control voltage which causes the sum signal channel to be blocked in response to the absence of a pilot tone.

With the aid of a circuit arrangement constructed in accordance with the present invention, during the tuning of a stereo receiver, all of the mono-transmitters are suppressed, since the corresponding received signal contains no pilot tone. This considerably simplifies the hunting of stereo transmitters.

In an advantageous embodiment of the invention, the control signal for the attenuator is fed, via a manually operable switch, so that the automatic disconnection of the mono-transmitters can also be prevented. Thus, when the switch is in an approriate position, it is also possible to reproduce mono-transmissions.

In an advantage embodiment of a circuit arrangement constructed in accordance with the invention, the attenuator comprises two differential amplifiers each having two transistors interconnected at their emitters. The control voltage is connected between the bases of the interconnected transistors. The transistors of the first differential amplifier are connected by way of their emitters to a source for the sum signal (L+R), and the transistors of the second differential amplifier are connected by way of their emitters to a constant current source. The collectors of, in each case, one of the differential amplifier transistors are connected, one pair leading to the supply potential and the other pair being connected to the matrix input for the sum signal (L+R).

BRIEF DESCRIPTION OF THE DRAWING

Other objects, features and advantages of the invention, its organization, construction and operation will be best understood from the following detailed description taken in conjunction with the accompanying drawing, on which.

DESCRIPTION OF THE PREFERRED EMBODIMENT

Figure 1:
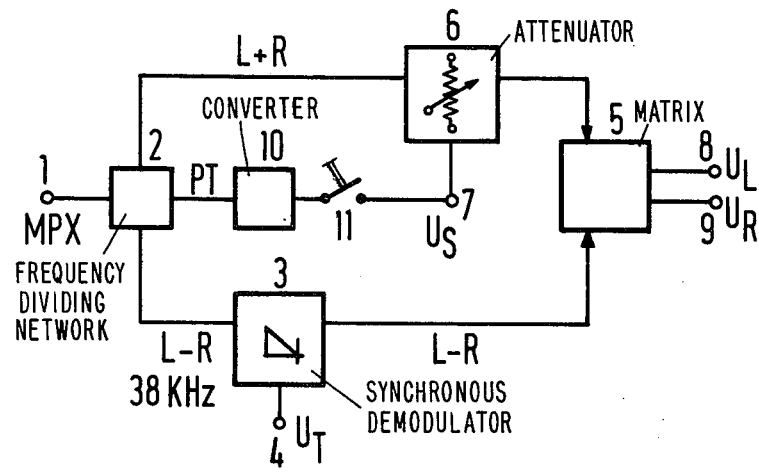
FIG. 1 is a simplified schematic block circuit diagram of a stereo decoder having a circuit arrangement constructed in accordance with the present invention.

In FIG. 1, the reference 1 indicates an input for a so-called MPX signal which, in the case of a stereo transmitter, contains the three components mentioned above: the sum signal (L+R) in the frequency state from 30 Hz to 15 kHz, the pilot tone PT of 19 kHz and the difference signal (L−R) in the carrier frequency state from 23 to 53 kHz. A frequency dividing network 2 receives and splits the input signal into the sum signal (L+R) and the difference signal (L−R) in the carrier frequency state of 38 kHz. The carrier frequency difference signal (L−R) is fed to a synchronous demodulator 3 which, with the aid of an auxiliary carrier $U_t$ obtained from the pilot PT and fed by way of an input 4, forms the difference signal (L−R) in the original frequency state from 30 Hz to 15 kHz. The difference signal channel is connected to an attenuator 6 having a control input 7 for receiving a control voltage $U_S$. The matrix has two outputs 8 and 9 for providing the reproduction signals $U_L$ and $U_R$. A third output for the frequency dividing filter 2 for the pilot tone PT is connected to a converter 10 which forms the control voltage $U_S$ for the attenuator 6. This control voltage is connected by way of a switch 11 to the input 7 for the attenuator 6. In the matrix 5, the reproduction signals $U_L$ and $U_R$ are formed from the sum signal (L+R) and from the difference signal (L−R) in accordance with the following equations:

$$U_L = (L+R) + (L-R) = 2L; \text{ and}$$

$$U_R = (L+R) - (L-R) = 2R.$$

The manner in which the signal channels are divided in the frequency dividing filter is left open in that the same can be achieved in a variety of ways. For example, it can be effected via a low pass filter and a band pass filter in the frequency dividing filter. However, it is also possible to feed the entire MPX signal in the sum signal channel to the matrix 5, and in the difference signal channel to the synchronous demodulator 3. Then, the output signals of the matrix 5 each possess components of the other channel in the 38 kHz state, which can be filtered out easily by appropriate low pass filters.

If the switch 11 is open, then in any case the sum signal (L+R) is forwarded to the matrix. If, however, the switch 11 is closed, the control voltage $U_S$ modulates the attenuator 6 in such a manner that in the absence of the pilot tone PT the sum signal (L+R) does not reach the matrix 5. That is to say that in the case of a mono-transmission nothing is reproduced. It is only a full and complete MPX signal, with which a pilot tone PT is additionally transmitted, that will reset the attenuator 6, so that both the signal channels are free again and the full stereo signal can be reproduced.

Figure 2:
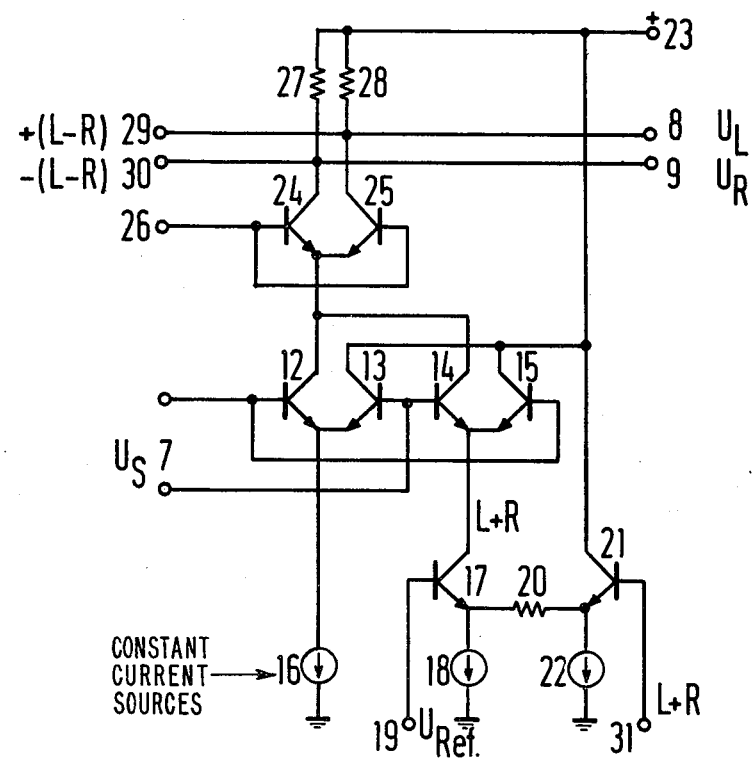
FIG. 2 is a schematic circuit diagram of an arrangement constructed in accordance with the invention and particularly suited for integration.

In FIG. 2, the attenuator 6 is illustrated as comprising four transistors 12, 13, 14 and 15. Here, the bases of the transistors 12 and 15 are interconnected and are connected to one of the two terminals of the control input 7 for receiving the control voltage $U_S$, and the bases of the two transistors 13 and 14 are interconnected and connected to the other of the two terminals of the input 7. The emitters of the two transistors 12 and 13 are connected to one another and lead, by way of a constant current source 16, to a reference potential, here ground. The emitters of the two transistors 14 and 15 are connected to one another and lead, via the collector-emitter path of a transistor 17 and a constant current source 18 to the reference potential. The base of the transistor 17 is connected to an input 19 for receiving a reference voltage $U_{Ref}$. The emitter is connected by way of a resistor 20 to the emitter of a transistor 21, whose emitter is connected by way of a constant current source 22 to the reference potential and whose base is connected to an input 31 for receiving the sum signal (L+R). The collector of the transistor 21 is connected to a terminal 23 for receiving and which represents a supply potential. The collectors of the two transistors 13 and 15 are likewise connected to the terminal 23. The collectors of the two transistors 12 and 14 are connected to the interconnected emitters of the two transistors 24 and 25, whose bases are likewise interconnected and are connected to an input 26 for receiving an auxiliary potential. The collector of the transistor 24 is connected by way of a resistor 27 to the terminal 23 and the collector of the transistor 25 is connected by way of a resistor 28 to the terminal 23 for receiving the supply potential. The collector of the transistor 25 is also connected to an input 29 for a positive difference signal (L−R) and to an output 8 for a reproduction signal $U_L$. The collector of the transistor 24 is connected to an input 30 for a negative difference signal −(L−R) and to an output 9 for a reproduction signal $U_R$.

The circuit arrangement illustrated in FIG. 2 contains a specific embodiment for the attenuator 6 and a specific embodiment for the matrix 5, such as is suitable for construction as an integrated circuit. The transistors 17 and 21 are amplifier transistors. The sum signal (L+R) is available across the collector of the transistor 17 and is fed to the attenuator 6. Depending upon the magnitude and polarity of the control voltage $U_S$ fed in at the control input 7, either the transistors 12 and 15 or the transistors 13 and 14 are more conductive. In the first case, the output of the attenuator 6—i.e. the interconnected emitters of the two transistors 24 and 25—conducts a larger component of the dc current supplied by the constant current source 16, whereas the major part of the ac current supplied by the transistor 17 of the sum signal (L+R) is fed directly to the terminal 23. In the other case, vice versa, the ac component of the sum signal (L+R) at the output of the attenuator 6 predominates. The two transistors 24 and 25 split the signal supplied by the attenuator 6 in half between the two resistors 27 and 28. The same resistors 27 and 28 are fed by way of the inputs 30 and 29 with the difference signal (L−R) with a negative and positive sign, so that the reproduction signal $U_L$ appears at the output 8 as the sum of the sum signal (L+R) and the difference signal (L−R), and the reproduction signal $U_R$ appears as the difference between the sum signal (L+R) and the difference signal (L−R) at the output 9. When the switch 11 is open, and in the case of mono-transmission, the two reproduction signals $U_L$ and $U_R$ consist only of the sum signal (L+R). When the switch 11 is closed, and in the case of mono-transmission, the two transistors 13 and 14 are blocked so that the sum signal (L+R) cannot pass to the resistors 27 and 28. Then only a dc voltage is present at the outputs 8 and 9. In the case of a stereo transmission the two transistors 12 and 15 are blocked so that the entire sum signal (L+R) can pass to the two resistors 27 and 28, where the reproduction signals $U_L$ and $U_R$ are then formed with the difference signals +(L+R) and −(L−R).

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a stereo receiving apparatus of the type which receives a stereo transmission having a pilot tone component and sum signal and difference signal components of two reproduction signals, and in which the sum signal and difference signal components are fed in respective channels to and are converted in a matrix operating with sum and difference formation to form the reproduction signals, and in which only the sum signal is present in the case of a mono-received signal, the improvement therein comprising:
   control signal means for receiving the pilot tone signal and operable to produce a control signal in response to the absence of the pilot tone signal; and
   an attenuator interposed in the sum signal channel, said attenuator including a control input connected to said control means and operable to block the sum channel in response to said control signal.

2. The improved stereo receiving apparatus of claim 1, comprising a manually operable switch connected between said control signal means and said control input of said attenuator.

3. The improved stereo receiving apparatus of claim 1, wherein said attenuator comprises:
   first and second differential amplifiers respectively including first and second transistors and third and fourth transistors,
   each of said transistors including a base, an emitter and a collector,
   an attenuator input for receiving the sum signal, an attenuator output connected to the matrix, and
a constant current source,
said emitters of said first and second transistors connected together and connected to said attenuator input to receive the sum signal,
said emitters of said third and fourth transistors connected together and to a constant current source,
said bases of said first and fourth transistors connected together and said bases of said third and second transistors connected together, said connected bases connected to said control input to receive said control signal,
said collectors of said first and third transistors connected to a supply potential, and
said collectors of said second and fourth transistors connected to the sum signal input of the matrix.

* * * * *